United States Patent
Sherwin, Jr. et al.

(10) Patent No.: US 11,520,648 B2
(45) Date of Patent: Dec. 6, 2022

(54) FIRMWARE EMULATED WATCHDOG TIMER CONTROLLED USING NATIVE CPU OPERATIONS

(71) Applicant: Microsoft Technology Licensing, LLC, Redmond, WA (US)

(72) Inventors: Bruce John Sherwin, Jr., Woodinville, WA (US); Neeraj Ladkani, Bothell, WA (US); Jason Stewart Wohlgemuth, Seattle, WA (US); James Anthony Schwartz, Jr., Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 119 days.

(21) Appl. No.: 17/033,486

(22) Filed: Sep. 25, 2020

(65) Prior Publication Data

US 2022/0100596 A1 Mar. 31, 2022

(51) Int. Cl.
G06F 11/30 (2006.01)
G06F 11/07 (2006.01)
G06F 9/4401 (2018.01)
G06F 11/14 (2006.01)
G06F 13/42 (2006.01)

(52) U.S. Cl.
CPC ........ *G06F 11/0757* (2013.01); *G06F 9/4401* (2013.01); *G06F 11/1415* (2013.01); *G06F 13/4282* (2013.01)

(58) Field of Classification Search
CPC ............... G06F 11/0757; G06F 9/4401; G06F 11/1415; G06F 13/4282
See application file for complete search history.

(56) References Cited

U.S. PATENT DOCUMENTS

| | | |
|---|---|---|
| 9,842,003 B2 | 12/2017 | Rao et al. |
| 9,971,609 B2 | 5/2018 | Balakrishnan et al. |
| 10,104,176 B2 | 10/2018 | Kutch |
| 10,127,095 B2 | 11/2018 | Lai et al. |

(Continued)

OTHER PUBLICATIONS

"International Search Report and Written Opinion Issued in PCT Application No. PCT/US21/037145", dated Oct. 27, 2021, 11 Pages.

(Continued)

*Primary Examiner* — Matthew M Kim
*Assistant Examiner* — Kyle Emanuele
(74) *Attorney, Agent, or Firm* — Workman Nydegger (57) ABSTRACT

Implementing a firmware watchdog timer. A system presents a data structure over a bus which exposes, to software executing at a central processing unit (CPU), a hardware resource that is associated with a watchdog timer, attribute (s) of the watchdog timer, and (iii) commands available to the software executing at the CPU for managing the watchdog timer via one or more native CPU instructions that target the hardware resource. The system listens on the bus for a data value written to the hardware resource (i.e., by a native CPU operation issued by the software executing at the CPU), and identifies a particular command for managing the watchdog timer based on the data value written. Based on identifying the particular command, the system performs at least one of: initializing the watchdog timer, starting the watchdog timer, resetting the watchdog timer, or stopping the watchdog timer.

21 Claims, 4 Drawing Sheets

(56) References Cited

U.S. PATENT DOCUMENTS

| | | | |
|---|---|---|---|
| 10,534,618 B2 | 1/2020 | Balakrishnan et al. | |
| 2006/0156075 A1* | 7/2006 | Mitsuishi | G06F 11/0721 714/51 |
| 2014/0289570 A1* | 9/2014 | Lewis | G06F 11/0706 714/43 |
| 2018/0113764 A1* | 4/2018 | Bhandari | G06F 11/0712 |
| 2020/0012552 A1* | 1/2020 | Brown | G06F 9/4406 |
| 2020/0089572 A1 | 3/2020 | Bodner et al. | |

OTHER PUBLICATIONS

"Bmc-watchdog (8)—Linux Man Pages-", Retrieved from: https://www.systutorials.com/docs/linux/man/8-bmc-watchdog/, Retrieved Date: Aug. 29, 2020, 12 Pages.

"Debugging", Retrieved from: https://en.wikipedia.org/wiki/Debugging, Retrieved Date: Aug. 12, 2020, 8 Pages.

"Persistence (computer science)", Retrieved from: https://en.wikipedia.org/wiki/Persistence_(computer_science), Retrieved Date: Aug. 12, 2020, 5 Pages.

"WatchDog Timer", Retrieved from: https://web.archive.org/web/20190107212610/https:/os.mbed.com/cookbook/WatchDog-Timer, Jan. 7, 2019, 7 Pages.

"Watchdog timer", Retrieved from: https://en.wikipedia.org/wiki/Watchdog_timer#Corrective_actions, Retrieved Date: Aug. 12, 2020, 6 Pages.

"Watchdog timer", Retrieved from: https://www.ibm.com/support/knowledgecenter/SS5K6E_9.1.0/com.ibm.mqa.doc/administering/ad00210_.htm, Retrieved Date: Aug. 29, 2020, 5 Pages.

H, Zak, "Linux Kernel Watchdog Explained", Retrieved from: https://web.archive.org/web/20190604225742/https:/linuxhint.com/linux-kernel-watchdog-explained/, Jun. 4, 2019, 5 Pages.

Lamberson, Jim, "Single and Multistage Watchdog Timers", Retrieved from: https://web.archive.org/web/20140202093824/http:/www.sensoray.com/downloads/appnote_826_watchdog_1.0.0.pdf, Feb. 2, 2014, 7 Pages.

* cited by examiner

FIRMWARE EMULATED WATCHDOG TIMER CONTROLLED USING NATIVE CPU OPERATIONS

TECHNICAL FIELD

The present disclosure relates to systems, methods, and devices that provide a low-overhead watchdog timer implemented by system firmware.

BACKGROUND

In computing, a watchdog timer is a timer that is used to detect and recover from computer malfunctions. A watchdog timer regularly increments or decrements a count, and elapses (or times out) when the count reaches a defined value. When a watchdog timer is operating, a computer regularly resets the timer (sometimes referred to as "petting" or "kicking" the watchdog) to prevent the timer from elapsing. If, due to a hardware fault or program error, the computer fails to reset the watchdog timer, the timer elapses. Generally, the elapse of a watchdog timer initiates a pre-defined corrective action, such as resetting a hardware or software component in an attempt to restore normal system operation.

The Intelligent Platform Management Interface (IPMI) specifies an autonomous computer subsystem and communications protocol that provides management and monitoring capabilities independently of a computer's central processing unit (CPU) and a host operating system (OS) executing thereon. A baseboard management controller (BMC) is a microcontroller (e.g., embedded on the computer's motherboard) that provides intelligence for the IPMI subsystem. Among other things, the BMC monitors the computer system (including monitoring hardware sensors and running host software, for example) and can send alerts (e.g., via a network) if any defined parameters deviate from pre-set limits.

Some contemporary BMCs include a hardware watchdog timer. In these BMCs, a host OS (or an application executing thereon) starts and then periodically resets the BMC watchdog timer. If the BMC watchdog timer elapses, the BMC initiates a system restart (e.g., by restarting the system's CPU). The host OS interacts with the BMC watchdog timer (e.g., to start and reset the timer) via a predefined IPMI message format sent over a bus, such as low pin count (LPC) bus interconnecting the BMC with a system CPU (potentially through one more host bridges, such as a northbridge, a southbridge, a platform controller hub, and the like).

BRIEF SUMMARY

Many computer systems that comprise BMCs are server nodes that execute host software for which stability and security are utmost priorities. In light of these priorities, the inventors have recognized that it can be advantageous to ensure that this host software is as "light" or as "thin" as practical, which could mean avoiding implementing complicated communications stacks, such as an IPMI stack. In one example, this host software comprises a hypervisor, which in turn hosts one or more virtual machines (VMs). While it may be acceptable to implement an IPMI stack in a VM (e.g., for using BMC hardware watchdog timer to restart the VM if it becomes unresponsive), it may be impractical (e.g., from a security or stability standpoint) to implement an IPMI stack in a hypervisor, and by extension, it may be impractical for a hypervisor to utilize conventional BMC-provided hardware watchdog timer functionality (e.g., for ensuring health of the hypervisor, itself).

At least some embodiments described herein introduce an emulated firmware-based watchdog timer, together with a "lightweight" or "low bandwidth" communications mechanism for discovering and interacting with the watchdog timer. While the embodiments herein are could be applied to a variety of firmware-based system management controllers, in embodiments, the emulated firmware-based watchdog timer described herein is implemented at a BMC system management controller. For example, embodiments include firmware data structures and firmware logic—installed at a firmware-based system management controller such as a BMC—for facilitating discovery and implementation of an emulated watchdog timer. In particular, one or more firmware data structures are exposed by the system management controller to host software executing at a CPU of a computer system. These firmware data structure(s) are used by the host software to discover the availability of an emulated watchdog timer, including hardware resource(s) use to interact with the watchdog timer using "lightweight" or "low bandwidth" communications (e.g., native CPU operations writing directly to the hardware resource), attribute(s) of the watchdog timer, and commands for interacting with the watchdog timer. Firmware logic monitors this hardware resource to identify value(s) written to the hardware resource (and command(s) corresponding to those value(s)), and to carry out those command(s) on a watchdog timer that is emulated on a processor of the system management controller.

Since embodiments implement a watchdog timer using firmware data structures and firmware logic, some embodiments enable watchdog functionality to be introduced to a system management controller, or updated at the system management controller, by way of a firmware update. In embodiments, these firmware updates can be applied without interruption of host software—such as a hypervisor and VMs executing thereon. Thus, some embodiments can introduce new watchdog functionality for monitoring a hypervisor (or update that watchdog functionality) without interrupting the hypervisor.

In some embodiments, method, systems, and storage devices implement a watchdog timer. In an example, a system includes a processor, communications hardware configured to communicate with a CPU over a bus, and one or more hardware storage devices that store one or more data structures and instructions that are executable by the processor. The instructions cause the system to present the one or more data structures over the bus. The one or more data structures expose, to software executing at the CPU, at least, (i) a hardware resource that is associated with a watchdog timer; (ii) one or more attributes of the watchdog timer; and (iii) one or more commands available to the software executing at the CPU for managing at least the watchdog timer via one or more native CPU instructions that target the hardware resource. The instructions also cause the system to listen, on the bus, for one or more data values written to the hardware resource by the software executing at the CPU. The instructions also cause the system to, based on listening for the one or more data values written to the hardware resource, identify a particular command for managing the watchdog timer. The instructions also cause the system to, based on identifying the particular command for managing the watchdog timer, perform at least one of: initializing the watchdog timer, starting the watchdog timer, resetting the watchdog timer, or stopping the watchdog timer.

This summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION

The embodiments described herein are directed to an emulated firmware-based watchdog timer, together with a "lightweight" or "low bandwidth" communications mechanism for discovering and interacting with the watchdog timer. As used herein, a "lightweight" or "low bandwidth" communications mechanism uses direct bus communications of native CPU operations to interact with a hardware resource. This is in contrast to "heavyweight" or "high bandwidth" communications stack—such as IPMI—which uses operations that are abstracted above the level of direct bus communications of native CPU operations (e.g., using one or more abstraction layers such as a data link layer, transport layer, session layer, application layer, etc.). While the embodiments herein are could be applied to a variety of firmware-based system management controller, in embodiments, the emulated firmware-based watchdog timer described herein is implemented at a BMC system management controller.

Embodiments include firmware data structures and firmware logic—installed at a firmware-based system management controller such as a BMC—for facilitating discovery and implementation of an emulated watchdog timer. In particular, one or more firmware data structures are exposed by the system management controller to host software executing at a CPU of a computer system. These firmware data structure(s) are used by the host software to discover the availability of an emulated watchdog timer, including hardware resource(s) use to interact with the watchdog timer using "lightweight" or "low bandwidth" communications (e.g., native CPU operations writing to the hardware resource), attribute(s) of the watchdog timer, and commands for interacting with the watchdog timer. Firmware logic monitors this hardware resource to identify value(s) written to the hardware resource (and command(s) corresponding to those value(s)), and to carry out those command(s) on a watchdog timer that is emulated on a processor of the system management controller.

Figure 1:
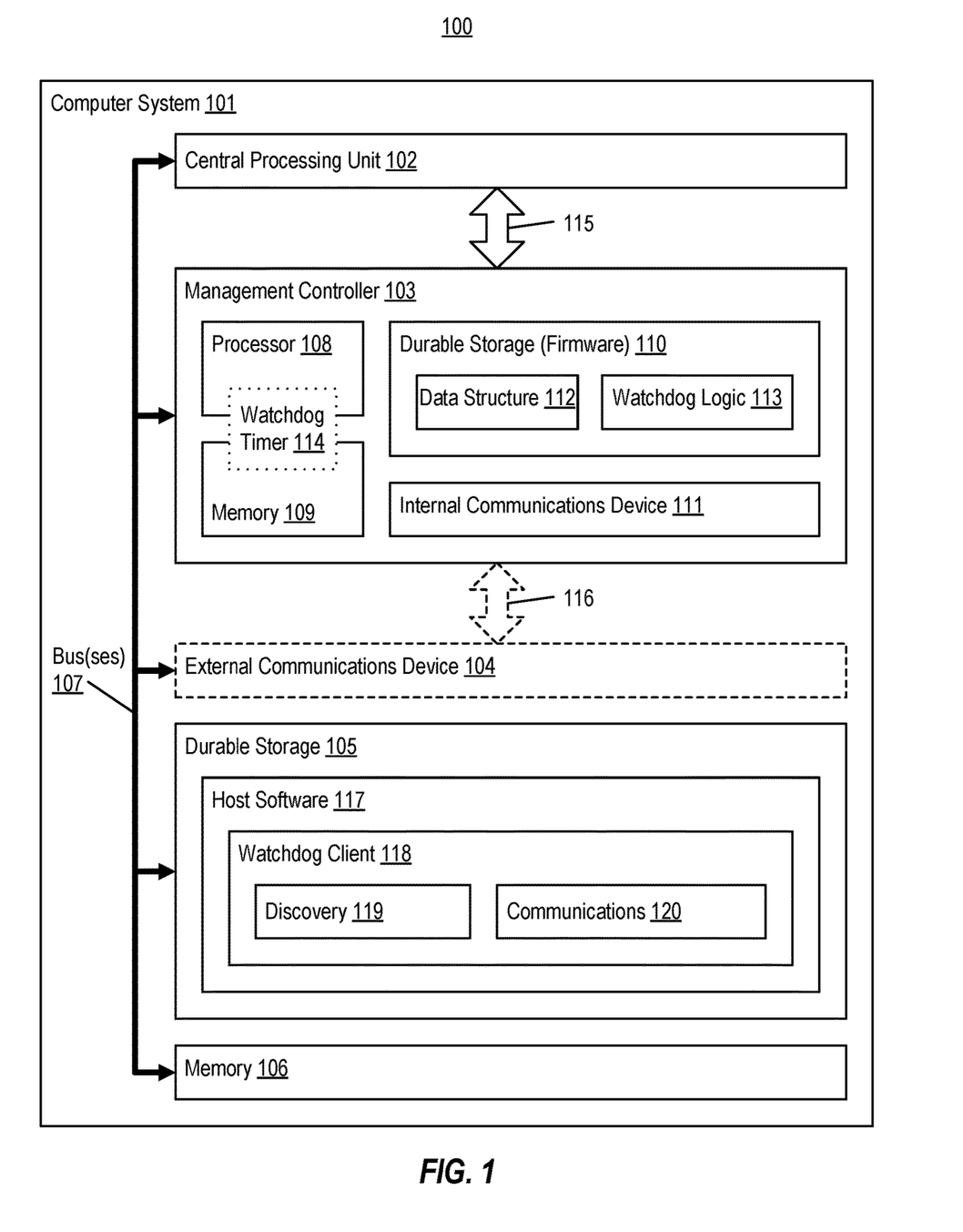
FIG. 1 illustrates an example computer architecture that enables firmware at a management controller to implement an emulated watchdog timer controlled using native CPU operations.

To the accomplishment of the foregoing, FIG. 1 illustrates an example computer architecture 100 that enables firmware at a management controller to implement an emulated watchdog timer controlled using native CPU operations. As shown, computer architecture 100 includes a computer system 101 that comprises at least one central processing unit (CPU) 102, a management controller 103, durable storage 105, and memory 106, all communicatively coupled via one or more bus(ses) 107. Computer system 101 may also comprise an external communications device 104 (e.g., Ethernet adapter, WiFi adapter, etc.), also communicatively coupled to the bus(es) 107.

In embodiments, the management controller 103 is an independent computer system, such as a microcontroller, embedded within computer system 101. As such, management controller 103 includes a processor 108 (e.g., independent of CPU 102), a memory 109 (e.g., independent of memory 106), and a durable storage 110 (e.g., independent of durable storage 105). As shown, the durable storage 110 stores firmware, which controls operation of the management controller 103. In embodiments, the management controller 103 monitors sensors (not shown) within computer system 101 to obtain operational information such as temperature, cooling fan speeds, power status, OS status, etc. In embodiments, the management controller 103 monitors sensor data, and generates alerts if any of the parameters do not stay within pre-set limits, indicating a potential failure or fault of computer system 101. In embodiments, the management controller 103 is a BMC, though the embodiments herein are applicable to other types of system management controllers.

As shown, the management controller 103 also includes an internal communications device 111. In embodiments, the internal communications device 111 facilitates communications with CPU 102 over a bus 115. In embodiments, the bus 115 is one of bus(es) 107; however, in other embodiments, the bus 115 is separate from bus(es) 107. In embodiments, the bus 115 is an LPC bus, though the embodiments herein are applicable to other types of busses.

In some embodiments, the internal communications device 111 also facilitates communications with external communications device 104 over a bus 116. In embodiments, the bus 116 is one of bus(es) 107; however, in other embodiments, the bus 116 is separate from bus(es) 107. In embodiments, the bus 116 is a System Management Bus (SMBus), though the embodiments herein are applicable to other types of busses. In embodiments in which the management controller 103 communicates with external communications device 104, the management controller 103 facilitates remote low-level control of computer system 101 (e.g., such as to reset or power cycling the computer system 101, to reset the CPU 102, etc.), alerting via the external communications device 104, logging via the external communications device 104, and the like.

The management controller 103 is illustrated as including a watchdog timer 114. The watchdog timer 114 is shown in broken lines, and as bridging the processor 108 and the memory 109. Together, this indicates that, in embodiments, the watchdog timer 114 is emulated (i.e., using processor 108, and potentially memory 109) based on data and logic within the firmware stored in durable storage 110. Thus, the watchdog timer 114 is a firmware emulated watchdog timer implemented via software/firmware logic (e.g., as opposed to a hardware watchdog timer implemented via hardware logic). Although only a single watchdog timer is shown in FIG. 1, in embodiments the management controller 103 implements a plurality of firmware emulated watchdog timers.

As indicated within durable storage 110, the stored firmware is shown as including a data structure 112 (which could include a plurality of data structures), which is used by the management controller 103 to expose the availability of the watchdog timer 114 to host software 117 executing at the CPU 102, as well to expose as how the watchdog timer 114 is accessed and interacted with. In embodiments, the data structure 112 is presented by the management controller 103 to the host software 117, and facilitates discovery of the watchdog timer 114 by a watchdog client 118 executing within the host software 117. In embodiments, the management controller 103 presents the data structure 112 to the host software 117 by loading the data structure 112 into memory 106 (e.g., via direct memory access over the buss(es) 107, by providing instructions to the CPU 102, etc.), or by otherwise making the data structure 112 accessible within an address space available to host software 117. In some implementations, the data structure 112 comprises one or more Advanced Configuration and Power Interface (ACPI) tables, such as one or more of a WDAT or a WDRT table.

Figure 2:
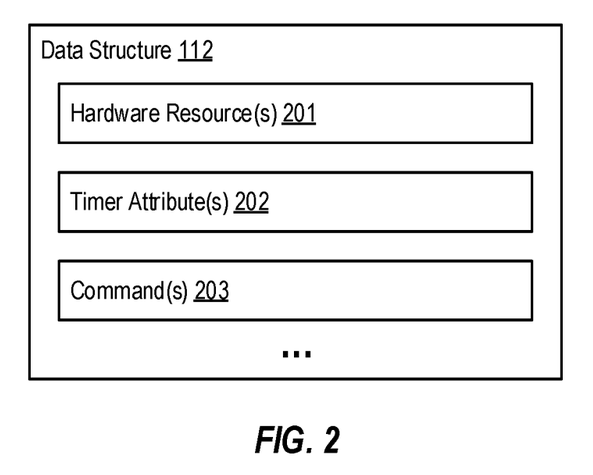
FIG. 2 illustrates an example data structure that facilitates emulated firmware watchdog discovery.

FIG. 2 illustrates an example of data structure 112, which facilitates emulated firmware watchdog discovery. In general, data structure 112 comprises a plurality of data fields that define information relevant to use of the watchdog timer 114 by the watchdog client 118. In embodiments, a discovery component 119 of the watchdog client 118 reads these data fields from a memory space addressable by host software 117, such as a memory space corresponding to memory 106.

As shown in FIG. 2, in some embodiments the data fields of data structure 112 include one or more data fields defining hardware resource(s) 201 used to interact with the watchdog timer 114. In embodiments, the hardware resource(s) 201 define one or more low-level hardware resources that can be accessed (e.g., read from and/or written to) by a communications component 120 of the watchdog client 118. In embodiments, the hardware resource(s) 201 include at least one hardware resource provided by the CPU 102, and that can be accessed by a native CPU operation. In one example, this hardware resource is a particular memory-mapped input/output (MMIO) hardware resource, such as a register of the CPU 102 that is mapped into a memory space accessible to the watchdog client 118; in this example, the hardware resource is accessible by using a memory read and/or write operation native to the CPU 102 (i.e., targeting a mapped memory address). In another example, this hardware resource is a particular model-specific register (MSR) of the CPU 102; in this example, the hardware resource is accessible by using a register read and/or write operation native to the CPU 102 (i.e., targeting the MSR). In another example, this hardware resource a particular input/output (I/O) port of the CPU 102; in this example, the hardware resource is accessible by using a native I/O port operation of the CPU 102 (i.e., targeting the I/O port).

As shown in FIG. 2, in some embodiments the data fields of data structure 112 include one or more data fields defining timer attribute(s) 202. In embodiments, the timer attribute(s) 202 define one or more attributes of the watchdog timer 114, itself, and are used by the watchdog client 118 to understand features and characteristics of the watchdog client 118. In one example, the timer attribute(s) 202 define a period of the watchdog timer 114—i.e., a duration (or available programmable durations) of each "count" or "tick" of the timer. In embodiments, the period of the watchdog timer 114 is defined in terms of time (e.g., a particular number of milliseconds, a particular number of seconds, etc.), but the period of the watchdog timer 114 could be defined using any other appropriate mechanism—such as a number of clock cycles (e.g., of CPU 102, of processor 108, etc.). In another example, the timer attribute(s) 202 define a timeout attribute (or available programmable timeouts), such as at which timer value the watchdog timer 114 elapses (e.g., zero if the watchdog timer 114 counts down, or some positive integer if the watchdog timer 114 counts up). In another example, the timer attribute(s) 202 define a minimum count attribute, such as a minimum number of periods for which the watchdog timer 114 can be programmed to increment or decrement. In another example, the timer attribute(s) 202 define a maximum count attribute, such as a maximum number of periods for which the watchdog timer 114 can be programmed to count.

As shown in FIG. 2, in some embodiments the data fields of data structure 112 include one or more data fields defining command(s) 203 available for interacting with the watchdog timer 114. In embodiments, the command(s) 203 define one or more values to be written to the hardware resource(s) 201 by the communications component 120 in order to issue a command related to the watchdog timer 114. In embodiments, these commands include one or more of a timer instantiation command, a timer start command, a timer stop command, a timer reset command, one or more timer programming commands, and the like. In embodiments, the one or more timer programming commands include one or more commands to program or specify a timer attribute, such as the timer's period, timeout, minimum count, maximum count, etc. In embodiments, the one or more timer programming commands include one or more commands to program or specify a policy, including an action to be taken when the watchdog timer 114 elapses.

Since the watchdog timer 114 is emulated and controlled by firmware, these policy actions can be varied and rich, such as to stop the host software 117 (or a portion thereof) that is executing at the CPU 102, to restart the host software 117 (or a portion thereof) that is executing at the CPU 102, to log a memory dump (e.g., of memory 106) to durable storage 105 or over the external communications device 104, to log a register dump (e.g., from registers of CPU 102) to durable storage 105 or over the external communications device 104, to log a particular message to durable storage 105 or over the external communications device 104, to send an alert over the external communications device 104, to reset/restart the management controller 103, to notify a top-of-rack management system, etc. In embodiments, the one or more timer programming commands include one or more commands to specify one or more inputs to a policy action. In one example, the policy action comprises logging a memory dump, and input(s) to the policy action specify one or more ranges of memory address which can be used to limit a scope of the memory dump, or to provide annotation metadata for the memory dump (e.g., to identify which memory range(s) in the memory dump correspond to identified data structures).

In some embodiments, the command(s) 203 extend beyond interactions with the watchdog timer 114, and to interaction with, and control of, the management controller 103 itself. In these embodiments, the command(s) 203 can include, for example, a command to directly initiate a restart/reboot of the management controller 103, a command to initiate a management controller 103 log, a command to initiate a management controller 103 alert, and the like. Thus, in some embodiments, the command(s) 203 provide an additional/redundant control and communications channel between the host software 117 and the management controller 103, such as a control and communications channel that is additional to IPMI but that operates at a much lower level than IPMI (i.e., at the level of operations native to CPU 102 using direct wire communications on bus 115, without the added complexity of a data link layer, a transport layer, a session layer, an application layer, and the like).

Figure 3:
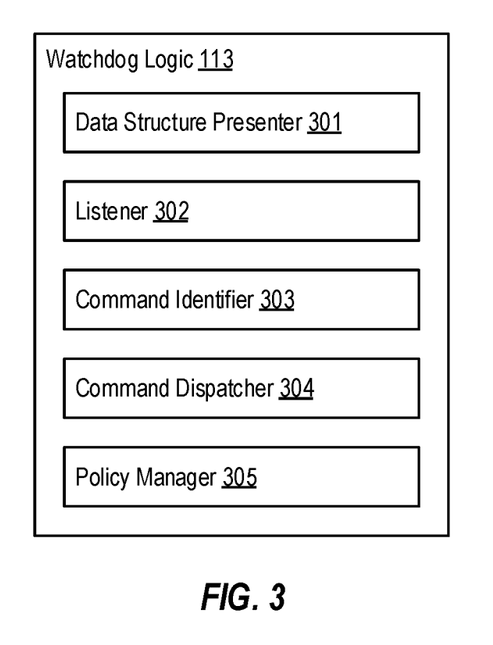
FIG. 3 illustrates example watchdog logic implemented by firmware at a management controller to provide an emulated firmware watchdog timer.

The stored firmware is also shown as including watchdog logic 113, which comprises instructions that are executed by the processor 108 of the management controller 103 to implement the watchdog timer 114 via emulation at the processor 108. To further describe example functionality of the watchdog logic 113, FIG. 3 illustrates an example of watchdog logic 113, which is implemented by firmware at a management controller to provide an emulated firmware watchdog timer. In the illustrated embodiment the watchdog logic 113 includes a variety of components (i.e., a data structure presenter 301, a listener 302, a command identifier 303, a command dispatcher 304, and a policy manager 305) that represent functions that the watchdog logic 113 implements in accordance with various embodiments described herein. It will be appreciated that the depicted components—including their identity, sub-components, and arrangement—are presented merely as an aid in describing various embodiments of the watchdog logic 113 described herein, and that these components are non-limiting to how software and/or hardware might implement various embodiments of the watchdog logic 113 described herein, or of the particular functionality thereof.

The data structure presenter 301 represents logic (e.g., executable instructions) for presenting the data structure 112 described previously to the host software 117 (including watchdog client 118). As discussed, in embodiments this includes loading the data structure 112 into memory 106, or otherwise making the data structure 112 accessible within an address space available to host software 117. In some embodiments, the data structure presenter 301 comprises, or interacts with, ACPI logic to present the data structure 112 to the host software 117 in the form of one or more ACPI tables.

The listener 302 represents logic (e.g., executable instructions) for listening on the bus 115 (e.g., an LPC bus) for changes to the hardware resource defined by the data structure 112 (i.e., hardware resource(s) 201). In some embodiments, the listener 302 snoops (or otherwise monitors) the hardware resource directly, by monitoring one or more memory locations, one or more registers, and the like. In other embodiments, the listener 302 snoops (or otherwise monitors) the hardware resource indirectly, by monitoring operations involving one or more memory locations, one or more registers, and the like.

The command identifier 303 represents logic (e.g., executable instructions) for identifying one or more commands based on one or more values identified by the listener 302. For example, after the communications component 120 of the watchdog client 118 writes one or more values to a hardware resource defined in the data structure 112 in order to issue a command defined in the data structure 112, the command identifier 303 identifies that command (and any parameters) by identifying those value(s). As mentioned in connection with FIG. 2, example commands include a timer instantiation command, a timer start command, a timer stop command, a timer reset command, one or more timer programming commands, and the like. As such, the command identifier 303 can operate to identify these commands, as well as any parameters to those commands.

The command dispatcher 304 represents logic (e.g., executable instructions) for dispatching and carrying out a command identified by the command identifier 303. As mentioned in connection with FIG. 2, example commands include a timer instantiation command, a timer start command, a timer stop command, a timer reset command, one or more timer programming commands, and the like. As such, the command dispatcher 304 operates operate to carry these commands, when identified by the command identifier 303. For example, when the command identifier 303 identifies a timer instantiation command, the command dispatcher 304 creates the watchdog timer 114 (e.g., at the processor 108); when the command identifier 303 identifies a timer start command, the command dispatcher 304 starts a periodic increment or decrement of the watchdog timer 114; when the command identifier 303 identifies a timer reset command, the command dispatcher 304 resets the watchdog timer 114 to a defined value; etc.

As mentioned, available commands may include the ability to specify a policy, including an action to be taken when the watchdog timer 114 elapses. The policy manager 305 represents logic (e.g., executable instructions) for tracking and managing these policies.

In some embodiments, the management controller 103 updatable to introduce emulated firmware watchdog functionality. For example, in some situations the management controller 103 lacks watchdog functionality, or includes only hardware-based watchdog functionality, but receives a firmware update (e.g., from the durable storage 105 or the external communications device 104) and writes that firmware update to durable storage 110, which newly introduces the data structure 112 and the watchdog logic 113 to the management controller 103. This firmware update thus enables the management controller 103 to expose data structure 112 to host software 117, and to receive and act on commands for creating and managing the watchdog timer 114.

In some embodiments, the management controller 103 is updatable to introduce emulated firmware watchdog functionality without interruption of execution of the host software 117. In some embodiments, after updating the management controller 103, the watchdog client 118 is made aware of the emulated firmware watchdog functionality during a subsequent restart of the host software 117 (or one or more sub-components thereof); in these embodiments the watchdog client 118 obtains the data structure 112 based on the data structure presenter 301 having created a memory mapping or having written to memory 106. In other embodiments, after updating the management controller 103, the watchdog client 118 is made aware of the emulated firmware watchdog functionality via some other mechanism that does not involve a restart of the host software 117, such as by making the contents of the data structure 112 available to the watchdog client via a file stored in the durable storage 105 or obtained over the external communications device 104.

In some embodiments, the management controller 103 is updatable to modify emulated firmware watchdog functionality. For example, in some situations the management controller 103 possesses emulated firmware watchdog functionality, but receives a firmware update (e.g., from the durable storage 105 or the external communications device 104) and writes that firmware update to durable storage 110, which provides one or more of a new version of the data structure 112 or a new version of the watchdog logic 113. In some embodiments, updates to one or more of the data structure 112 or the watchdog logic 113 provide additional watchdog capabilities, such as in terms of commands available, a number of watchdog timers available, etc. In some embodiments, updates to one or more of the data structure 112 or the watchdog logic 113 provide watchdog configuration changes, such as in terms of resource(s) used as part of hardware resource(s) 201, attributes within timer attribute(s) 202, etc.

While the host software 117 can comprises virtually any type of host software, in some embodiments the host software 117 comprises a hypervisor that implements the watchdog client 118. While in some embodiments a hypervisor discovers the watchdog timer 114 based presentation of the data structure 112 by the data structure presenter 301, in some embodiments the hypervisor discovers the watchdog timer 114 independent of presentation of the data structure 112 by the data structure presenter 301. For example, in some implementations, software executing at a VM (e.g., a root VM) discovers model identifier(s) corresponding to one or both of computer system 101 or management controller 103, and obtains the data fields contained in data structure 112 from a database (e.g., stored on the durable storage 105 or obtained over the external communications device 104) using these model identifier(s). In embodiments, this software places these data fields in a portion of memory 106, and injects this portion of memory into to the hypervisor. In this way, these data fields become accessible to the discovery component 119 independent of operation of the data structure presenter 301. In some implementations, the discovery component 119 only trusts data that is obtained from a VM that operates within a defined trust level, or data that is associated with an appropriate cryptographic credential or signature. In some embodiments, the management controller 103 is capable of emulating multiple watchdog timers, and the hypervisor is capable of allocating these watchdog timers to various VMs operating on the hypervisor.

As will be appreciated in view of the foregoing disclosure, the watchdog timer 114 described in connection with FIGS. 1-3 is distinguished from hardware watchdog timers provided by conventional BMCs. In one example, unlike the watchdog timer 114—which is emulated based on firmware logic/data structures—conventional BMCs implement watchdog timers using hardware logic. Thus, these conventional watchdog timers cannot by updated or introduced by a firmware update. Additionally, these conventional watchdog timers are generally hard-coded as to the action that occurs when they elapse, such as to reset a CPU. This is in contrast to watchdog timer 114, which is programmable with a rich (and updateable) variety of policy actions (as discussed previously). In another example, the watchdog timer 114 is dynamically discoverable via data structure 112, which provides instructions for accessing and using the watchdog timer 114. This is in contrast to conventional watchdog timers, which are generally accessed using predetermined commands or at a predetermined location—thus requiring special-purpose client software. Unlike conventional watchdog timers, the watchdog timer 114 described herein is accessible by general-purpose software by virtue of the discovery enabled by presentation of data structure 112. In another example, watchdog timer 114 is accessed using low-level native operations of the CPU 102, rather than a more heavyweight communications protocol, such as IMPI. Thus, the watchdog timer 114 is accessible to many types of software—such as hypervisors—for which use of a heavyweight communications protocol may be impractical.

The following discussion now refers to a number of methods and method acts. Although the method acts may be discussed in certain orders, or may be illustrated in a flow chart as occurring in a particular order, no particular ordering is required unless specifically stated, or required because an act is dependent on another act being completed prior to the act being performed.

Figure 4:
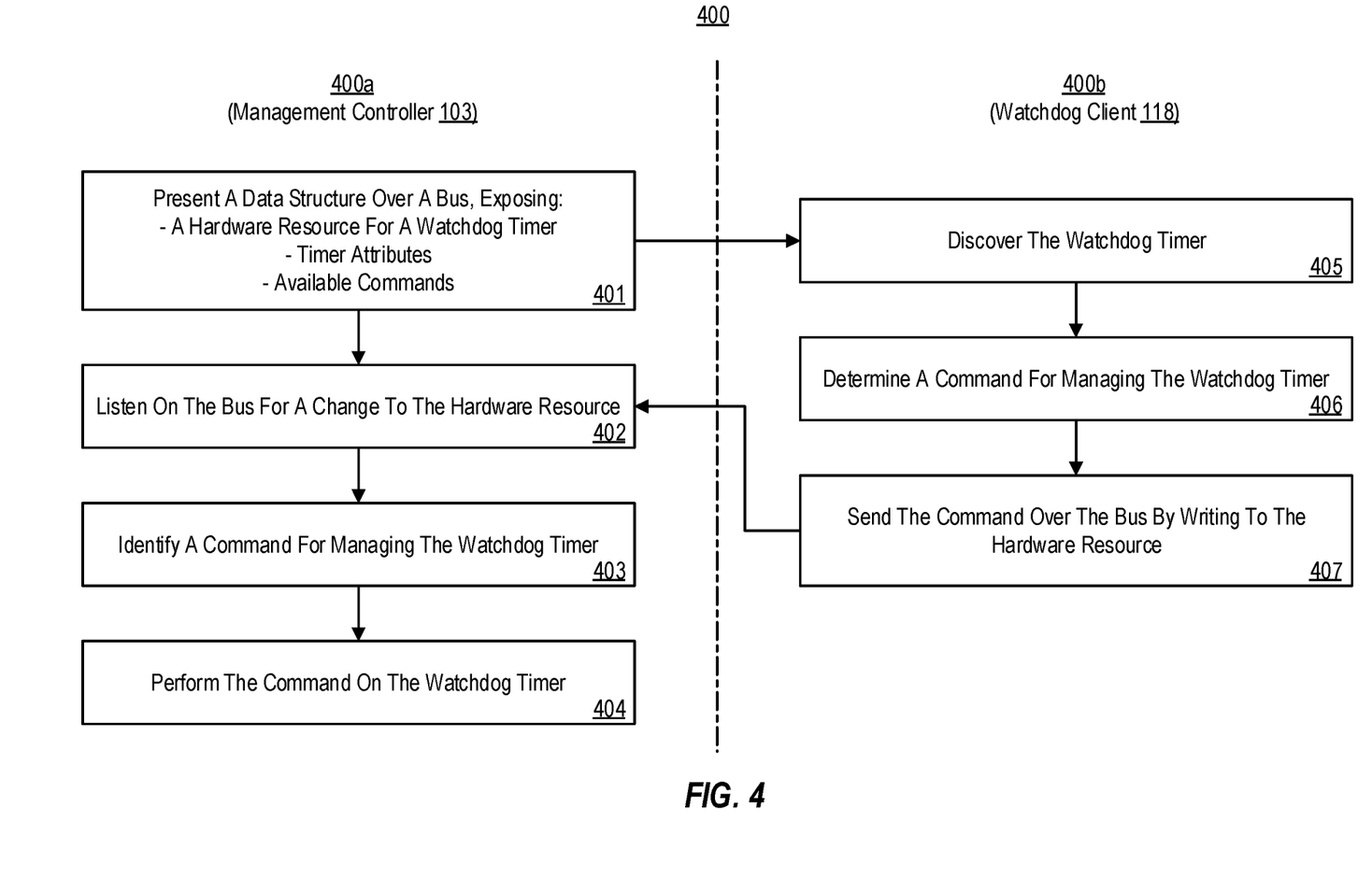
FIG. 4 illustrates a flow chart of an example method for implementing a watchdog timer.

FIG. 4 illustrates a flow chart of an example method 400 for implementing a watchdog timer, such as the watchdog timer 114 described in connection with FIG. 1, which is emulated at the processor 108 based on firmware stored in the durable storage 110. Method 400 will be described with respect to the components and data of computer architecture 100.

As shown, method 400 includes acts (i.e., 401-404) that are part of a method 400a, performed by the management controller 103, for implementing a watchdog timer. In these embodiments, method 400a is performed at a system (i.e., management controller 103) that comprises a processor (i.e., processor 108), communications hardware (i.e., internal communications device 111) configured to communicate with a CPU (i.e., CPU 102) over a bus (i.e., bus 115, such as an LPC bus), and one or more hardware storage devices (i.e., durable storage 110) that store one or more data structures (i.e., data structure 112) and instructions (i.e., watchdog logic 113) that are executable by the processor to implement method 400a. Method 400 also includes acts (i.e., 405-407) that are part of a method 400b, performed by computer system 101 (i.e., based on the CPU 102 executing the logic of the watchdog client 118), for interacting with a watchdog timer. In some embodiments, method 400 is a single integrated method performed by computer system 101 as a whole. In other embodiments, method 400 comprises separate, but related, methods 400a/400b performed by CPU 102 and management controller 103, respectively.

As shown, method 400a comprises an act 401 of presenting a data structure over a bus, exposing (i) a hardware resource for a watchdog timer, (ii) timer attributes, and (iii) available commands. In some embodiments, act 401 comprises presenting one or more data structures over a bus, the one or more data structures exposing, to software executing at the CPU, at least, (i) a hardware resource that is associated with a watchdog timer; (ii) one or more attributes of the watchdog timer; and (iii) one or more commands available to the software executing at the CPU for managing at least the watchdog timer via one or more native CPU instructions that target the hardware resource. In an example, the data structure presenter 301 presents the data structure 112 of the bus 115 to the host software 117, including to the watchdog client 118. As discussed, this presentation can be in any appropriate manner, but in some embodiments, it comprises the data structure presenter 301 writing contents of the data structure 112 to memory 106, or making the data structure 112 available in an address space accessible by the host software 117.

As discussed in connection with FIG. 2, the data structure 112 comprises a plurality of data fields, including one or more data fields specifying hardware resource(s) 201 for interacting with the watchdog timer 114, one or more data fields specifying attribute(s) 202 of the watchdog timer 114, and one or more data fields specifying command(s) 203 for interacting with the watchdog timer 114.

In embodiments, the hardware resource(s) 201 specify one or more hardware resources of the CPU 102, such as a memory mapped resource, an MSR, or an I/O port. Thus, in some embodiments, the hardware resource comprises an MMIO interface, an I/O port (e.g., of CPU 102), or an MSR (e.g., of CPU 102).

As discussed, in some examples, the attribute(s) 202 include a period of the watchdog timer, a timeout attribute (or available programmable timeouts), a minimum count attribute, or a maximum count attribute. Thus, in some embodiments of act 401, exposing the one or more attributes of the watchdog timer comprises exposing at least one of a timeout value, a time period definition, a minimum timer value, or a maximum timer value.

As discussed, in some examples, the command(s) 203 include commands for interacting with a watchdog timer, such as a timer instantiation command, a timer start command, a timer stop command, a timer reset command, a programming command (including programming policies), and the like. Thus, in some embodiments of act 401, exposing the one or more commands comprises exposing at least one of, a first command for instantiating the watchdog timer, a second command for starting the watchdog timer, a third command for stopping the watchdog timer, a fourth command for resetting the watchdog timer, a fifth command for defining a policy, including defining an action to be performed upon expiration of the watchdog timer, or a sixth command for defining an input to the action to be performed upon expiration of the watchdog timer.

In some examples, the command(s) 203 also include commands for interacting with or controlling the management controller 103, itself. Thus, in some embodiments of act 401, exposing the one or more commands comprises exposing at least one of a seventh command for restarting the system (e.g., the management controller 103), an eighth command for restarting the CPU 102; or a ninth command for logging a message (e.g., relating to the management controller 103).

As discussed, in embodiments issuance of the command(s) 203 is accomplished through operations native to the CPU 102 that interact with the specified hardware resource(s) 201, such as memory access operations, register access operations, or I/O port operations. Thus, in some embodiments, the one or more native CPU instructions comprise a CPU instruction writing to the hardware resource.

As shown, act 401 leads to an act 405 of method 400b (at the watchdog client 118) of discovering the watchdog timer. In some embodiments, act 405 comprises identifying a data structure presented by a firmware-based management controller. In an example, the discovery component 119 discovers the contents of the data structure 112 that are presented by the data structure presenter 301, such as by identifying the data structure 112 within a memory address space accessible to the watchdog client 118. In some embodiments, the discovery component 119 participates in a system initialization protocol to discover the data structure 112, such as by identifying one or more ACPI tables are part of an ACPI initialization process. As will be appreciated in view of the discussion of FIG. 2, the contents of the data structure 112 facilitates a discovery of watchdog timer 114 by discovery component 119, including discovery of at least one hardware resource for interacting with the watchdog timer 114 (i.e., hardware resource(s) 201), attributes of the watchdog timer 114 (i.e., attribute(s) 202), and commands for interacting with the watchdog timer 114 (i.e., command(s) 203).

After act 405, method 400b comprises an act 406 of determining a command for managing the watchdog timer. In some embodiments, act 406 comprises, based on parsing one or more command fields in the data structure, determining a command for managing the watchdog timer. In an example, based on command(s) 203, the communications component 120 determines a particular command for managing the watchdog timer 114, such as a timer instantiation command, a timer start command, a timer stop command, a timer reset command, a programming command (including programming policies), and the like.

After act 406, method 400b comprises an act 407 of sending the command over the bus by writing to the hardware resource. In some embodiments, act 407 comprises sending the command for managing the watchdog timer by using a native CPU operation to write one or more values to the hardware resource. In an example, the communications component 120 writes one or more values to a resource identified from the hardware resource(s) 201 specified in the data structure 112.

Returning to method 400a (at the management controller 103), and as shown, act 401 also leads to an act 402 of listening on the bus for a change to the hardware resource. In some embodiments, act 402 comprises listening, on the bus, for one or more data values written to the hardware resource by the software executing at the CPU. In an example, the listener 302 listens on the bus 115 for changes to the hardware resource defined by the data structure 112. As discussed, this listening can include snooping (or otherwise monitoring) the hardware resource directly (e.g., by monitoring one or more memory locations, one or more registers, and the like) or indirectly (e.g., by monitoring operations involving one or more memory locations, one or more registers, and the like).

As shown, an arrow leads from act 407 (method 400b) of the watchdog client 118 sending the command over the bus by writing to the hardware resource to act 402 (method 400a) of the management controller 103 listening on the bus for a change to the hardware resource. When act 407 occurs, based on the listening in act 402, method 400b comprises an act 403 of identifying a command for managing the watchdog timer. In some embodiments, act 403 comprises, based on listening for the one or more data values written to the hardware resource, identifying a particular command for managing the watchdog timer. In an example, after the listener 302 has identified one or more data values written by the communications component 120 to the hardware resource defined in hardware resource(s) 201, the command identifier 303 identifies a command specified by those data value(s), together with any command parameters. As will be appreciated, the command identified by the command identifier 303 is a command defined in the command(s) 203.

Method 400b comprises an act 404 of performing the command on the watchdog timer. In some embodiments, act 404 comprises, based on identifying the particular command for managing the watchdog timer, performing at least one of: initializing the watchdog timer, starting the watchdog timer, resetting the watchdog timer, or stopping the watchdog timer. In an example, the command dispatcher 304 dispatches the command identified by the command identifier 303 in act 403 to carry out the command with respect to the watchdog timer 114. In embodiments, dispatching the command comprises dispatching one or more executable instructions to the processor 108 that are configured to carry out the command. As discussed, examples commands include a timer instantiation command, a timer start command, a timer stop command, a timer reset command, a programming command (including programming policies), and the like.

As will be appreciated, once the watchdog timer 114 has been initialized and started, the timer may expire (elapse) if no reset command is recognized (e.g., in act 403) prior to the watchdog timer 114 reaching a count threshold. When this happens, the policy manager 305 takes a policy action triggered by the expiration. Thus, in some embodiments, method 400a comprises, upon detecting expiration of the watchdog timer, initiating an action specified by a policy. As discussed, since watchdog timer 114 is emulated based on firmware logic, these policy actions can be rich and varied. As examples, they can include stopping or restarting the host software 117 (or a portion thereof), resetting the CPU 102, logging a dump of memory 106, logging one or more registers of CPU 102, logging a message, sending an alert, restarting the management controller 103, etc. Thus, in some embodiments of method 400a the action specified by the policy comprises at least one of, stopping the software executing at the CPU; restarting the software executing at the CPU; logging a memory dump; logging a register dump; logging a message; sending an alert; or restarting the system.

As discussed, since the watchdog timer 114 is implemented via emulation based on firmware (i.e., data structure 112 and watchdog logic 113), in some embodiments the management controller 103 receives and installs a firmware update that introduces the firmware emulated watchdog functionality described herein. Thus, in some embodiments of method 400a, the system enables one or both of the one or more data structures or the instructions to be introduced to the hardware storage device in order to introduce watchdog timer functionality to the software executing at the CPU without restarting the software executing at the CPU.

Additionally, or alternatively, since the watchdog timer 114 is implemented via emulation based on firmware (i.e., data structure 112 and watchdog logic 113), in some embodiments the management controller 103 receives and installs a firmware update that updates already existing firmware emulated watchdog functionality (e.g., to modify the resource(s) 201 used, to change the attribute(s) 202, to add or remove command(s) 203, etc.). Thus, in some embodiments of method 400a, the system enables one or both of the one or more data structures or the instructions to be updated on the hardware storage device in order to alter watchdog timer functionality available to the software executing at the CPU without restarting the software executing at the CPU.

Accordingly, the embodiments described herein provide an emulated firmware-based watchdog timer, together with a "lightweight" or "low bandwidth" communications mechanism for discovering and interacting with the watchdog timer. Embodiments include firmware data structures and firmware logic—installed at a firmware-based system management controller—for facilitating discovery and implementation of an emulated watchdog timer. One or more firmware data structures are exposed by the system management controller to host software executing at a CPU of a computer system. These firmware data structure(s) are used by the host software to discover the availability of an emulated watchdog timer, including hardware resource(s) use to interact with the watchdog timer using "lightweight" or "low bandwidth" communications (e.g., native CPU operations writing to the hardware resource), attribute(s) of the watchdog timer, and commands for interacting with the watchdog timer. Firmware logic monitors this hardware resource to identify value(s) written to the hardware resource (and command(s) corresponding to those value(s)), and to carry out those command(s) on a watchdog timer that is emulated on a processor of the system management controller.

Although the subject matter has been described in language specific to structural features and/or methodological acts, it is to be understood that the subject matter defined in the appended claims is not necessarily limited to the described features or acts described above, or the order of the acts described above. Rather, the described features and acts are disclosed as example forms of implementing the claims.

Embodiments of the present invention may comprise or utilize a special-purpose or general-purpose computer system that includes computer hardware, such as, for example, one or more processors and system memory, as discussed in greater detail below. Embodiments within the scope of the present invention also include physical and other computer-readable media for carrying or storing computer-executable instructions and/or data structures. Such computer-readable media can be any available media that can be accessed by a general-purpose or special-purpose computer system. Computer-readable media that store computer-executable instructions and/or data structures are computer storage media. Computer-readable media that carry computer-executable instructions and/or data structures are transmission media. Thus, by way of example, and not limitation, embodiments of the invention can comprise at least two distinctly different kinds of computer-readable media: computer storage media and transmission media.

Computer storage media are physical storage media that store computer-executable instructions and/or data structures. Physical storage media include computer hardware, such as RAM, ROM, EEPROM, solid state drives ("SSDs"), flash memory, phase-change memory ("PCM"), optical disk storage, magnetic disk storage or other magnetic storage devices, or any other hardware storage device(s) which can be used to store program code in the form of computer-executable instructions or data structures, which can be accessed and executed by a general-purpose or special-purpose computer system to implement the disclosed functionality of the invention.

Transmission media can include a network and/or data links which can be used to carry program code in the form of computer-executable instructions or data structures, and which can be accessed by a general-purpose or special-purpose computer system. A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer system, the computer system may view the connection as transmission media. Combinations of the above should also be included within the scope of computer-readable media.

Further, upon reaching various computer system components, program code in the form of computer-executable instructions or data structures can be transferred automatically from transmission media to computer storage media (or vice versa). For example, computer-executable instructions or data structures received over a network or data link can be buffered in RAM within a network interface module (e.g., a "NIC"), and then eventually transferred to computer system RAM and/or to less volatile computer storage media at a computer system. Thus, it should be understood that computer storage media can be included in computer system components that also (or even primarily) utilize transmission media.

Computer-executable instructions comprise, for example, instructions and data which, when executed at one or more processors, cause a general-purpose computer system, special-purpose computer system, or special-purpose processing device to perform a certain function or group of functions. Computer-executable instructions may be, for example, binaries, intermediate format instructions such as assembly language, or even source code.

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like. The invention may also be practiced in distributed system environments where local and remote computer systems, which are linked (either by hardwired data links, wireless data links, or by a combination of hardwired and wireless data links) through a network, both perform tasks. As such, in a distributed system environment, a computer system may include a plurality of constituent computer systems. In a distributed system environment, program modules may be located in both local and remote memory storage devices.

Those skilled in the art will also appreciate that the invention may be practiced in a cloud computing environment. Cloud computing environments may be distributed, although this is not required. When distributed, cloud computing environments may be distributed internationally within an organization and/or have components possessed across multiple organizations. In this description and the following claims, "cloud computing" is defined as a model for enabling on-demand network access to a shared pool of configurable computing resources (e.g., networks, servers, storage, applications, and services). The definition of "cloud computing" is not limited to any of the other numerous advantages that can be obtained from such a model when properly deployed.

A cloud computing model can be composed of various characteristics, such as on-demand self-service, broad network access, resource pooling, rapid elasticity, measured service, and so forth. A cloud computing model may also come in the form of various service models such as, for example, Software as a Service ("SaaS"), Platform as a Service ("PaaS"), and Infrastructure as a Service ("IaaS"). The cloud computing model may also be deployed using different deployment models such as private cloud, community cloud, public cloud, hybrid cloud, and so forth.

Some embodiments, such as a cloud computing environment, may comprise a system that includes one or more hosts that are each capable of running one or more virtual machines. During operation, virtual machines emulate an operational computing system, supporting an OS and perhaps one or more other applications as well. In some embodiments, each host includes a hypervisor that emulates virtual resources for the virtual machines using physical resources that are abstracted from view of the virtual machines. The hypervisor also provides proper isolation between the virtual machines. Thus, from the perspective of any given virtual machine, the hypervisor provides the illusion that the virtual machine is interfacing with a physical resource, even though the virtual machine only interfaces with the appearance (e.g., a virtual resource) of a physical resource. Examples of physical resources including processing capacity, memory, disk space, network bandwidth, media drives, and so forth.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope. When introducing elements in the appended claims, the articles "a," "an," "the," and "said" are intended to mean there are one or more of the elements. The terms "comprising," "including," and "having" are intended to be inclusive and mean that there may be additional elements other than the listed elements.

What is claimed:

1. A management controller, comprising:
a management controller processor;
communications hardware configured for the management controller processor to communicate with a central processing unit (CPU) over a bus; and
one or more hardware storage devices that store one or more data structures and instructions that are executable by the management controller processor to cause the management controller to at least:
present the one or more data structures over the bus, the one or more data structures exposing, to a watchdog client executing at the CPU, at least:
(i) a hardware resource provided by the CPU that is associated with a watchdog timer; implemented by the management controller,
(ii) one or more attributes of the watchdog timer, and
(iii) one or more commands available to the watchdog client executing at the CPU for managing at least the watchdog timer via one or more native CPU instructions that target the hardware resource;
listen, on the bus, for one or more data values written to the hardware resource by the watchdog client executing at the CPU;
based on listening for the one or more data values written to the hardware resource, identify a particular command for managing the watchdog timer; and
based on identifying the particular command for managing the watchdog timer, perform at least one of: initializing the watchdog timer, starting the watchdog timer, resetting the watchdog timer, or stopping the watchdog timer.

2. The management controller of claim 1, wherein the management controller is a baseboard management controller (BMC) and the bus comprises a low pin count (LPC) bus.

3. The management controller of claim 1, wherein the hardware resource comprises a memory-mapped input/output (I/O) interface, a CPU I/O port, or a CPU model-specific register, and wherein the one or more native CPU instructions comprise a CPU instruction writing to the hardware resource.

4. The management controller of claim 1, the instructions also executable by the management controller processor to cause the management controller to, upon detecting expiration of the watchdog timer, initiate an action specified by a policy.

5. The management controller of claim 4, wherein the action specified by the policy comprises at least one of:
stopping software executing at the CPU,
restarting the software executing at the CPU,
logging a memory dump,
logging a register dump,
logging a message,
sending an alert,
restarting the management controller.

6. The management controller of claim 1, wherein exposing the one or more attributes of the watchdog timer comprises exposing at least one of a timeout value, a time period definition, a minimum timer value, or a maximum timer value.

7. The management controller of claim 1, wherein exposing the one or more commands comprises exposing at least one:
   a first command for instantiating the watchdog timer,
   a second command for starting the watchdog timer,
   a third command for stopping the watchdog timer,
   a fourth command for resetting the watchdog timer,
   a fifth command for defining a policy, including defining an action to be performed upon expiration of the watchdog timer,
   a sixth command for defining an input to the action to be performed upon the expiration of the watchdog timer,
   a seventh command for restarting the management controller,
   an eighth command for restarting the CPU, or
   a ninth command for logging a message.

8. The management controller of claim 1, wherein the management controller enables the instructions to be introduced to the one or more hardware storage devices in order to introduce watchdog timer functionality to software executing at the CPU without restarting the software executing at the CPU.

9. The management controller of claim 1, wherein the management controller enables the instructions to be updated on the one or more hardware storage devices in order to alter watchdog timer functionality available to software executing at the CPU without restarting the software executing at the CPU.

10. The management controller of claim 1, wherein the watchdog client executing at the CPU is a component of a hypervisor.

11. A method, performed at a management controller that includes a management controller processor, for implementing a watchdog timer, the method comprising:
   presenting one or more data structures over a bus to a central processing unit (CPU), the one or more data structures exposing, to a watchdog client executing at the CPU, at least;
      (i) a hardware resource provided by the CPU that is associated with the watchdog timer; implemented by the management controller,
      (ii) one or more attributes of the watchdog timer, and
      (iii) one or more commands available to the watchdog client executing at the CPU for managing at least the watchdog timer via one or more native CPU instructions that target the hardware resource;
   listening, on the bus, for one or more data values written to the hardware resource by the watchdog client executing at the CPU;
   based on listening for the one or more data values written to the hardware resource, identifying a particular command for managing the watchdog timer; and
   based on identifying the particular command for managing the watchdog timer, performing at least one of: initializing the watchdog timer, starting the watchdog timer, resetting the watchdog timer, or stopping the watchdog timer.

12. The method of claim 11, wherein the hardware resource comprises a memory-mapped input/output (I/O) interface, a CPU I/O port, or a CPU model-specific register, and wherein the one or more native CPU instructions comprise a CPU instruction writing to the hardware resource.

13. The method of claim 11, further comprising, upon detecting expiration of the watchdog timer, initiating an action specified by a policy.

14. The method of claim 13, wherein the action specified by the policy comprises at least one of:
   stopping software executing at the CPU,
   restarting the software executing at the CPU,
   logging a memory dump,
   logging a register dump,
   logging a message,
   sending an alert, or
   restarting the management controller.

15. The method of claim 11, wherein exposing the one or more attributes of the watchdog timer comprises exposing at least one of a timeout value, a time period definition, a minimum timer value, or a maximum timer value.

16. The method of claim 11, wherein exposing the one or more commands comprises exposing at least one of:
   a first command for instantiating the watchdog timer,
   a second command for starting the watchdog timer,
   a third command for stopping the watchdog timer,
   a fourth command for resetting the watchdog timer,
   a fifth command for defining a policy, including defining an action to be performed upon expiration of the watchdog timer,
   a sixth command for defining an input to the action to be performed upon the expiration of the watchdog timer,
   a seventh command for restarting the management controller,
   an eighth command for restarting the CPU, or
   a ninth command for logging a message.

17. The method of claim 11, wherein the management controller enables watchdog timer functionality to be introduced to software executing at the CPU without restarting the software executing at the CPU.

18. The method of claim 11, wherein the management controller enables watchdog timer functionality available to software executing at the CPU to be altered without restarting the software executing at the CPU.

19. A hardware storage device that stores instructions that are executable by a management controller processor to cause a management controller to implement a watchdog timer, the instructions being executable by the management controller processor to cause the management controller to at least:
   present one or more data structures over a bus to a central processing unit (CPU), the one or more data structures exposing, to a watchdog client executing at the CPU, at least:
      (i) a hardware resource provided by the CPU that is associated with the watchdog timer; implemented by the management controller,
      (ii) one or more attributes of the watchdog timer, and
      (iii) one or more commands available to the watchdog client executing at the CPU for managing at least the watchdog timer via one or more native CPU instructions that target the hardware resource;
   listen, on the bus, for one or more data values written to the hardware resource by the watchdog client executing at the CPU;
   based on listening for the one or more data values written to the hardware resource, identify a particular command for managing the watchdog timer; and
   based on identifying the particular command for managing the watchdog timer, perform at least one of: initializing the watchdog timer, starting the watchdog timer, resetting the watchdog timer, or stopping the watchdog timer.

20. The hardware storage device of claim 19, the instructions also being executable by the management controller processor to cause the management controller to, upon detecting expiration of the watchdog timer, initiate an action specified by a policy, the action specified by the policy comprising at least one of:
   stopping software executing at the CPU,
   restarting the software executing at the CPU,
   logging a memory dump,
   logging a register dump,
   logging a message,
   sending an alert, or
   restarting the management controller.

21. The hardware storage device of claim 19, wherein exposing the one or more commands comprises exposing at least one of:
   a first command for instantiating the watchdog timer,
   a second command for starting the watchdog timer,
   a third command for stopping the watchdog timer,
   a fourth command for resetting the watchdog timer,
   a fifth command for defining a policy, including defining an action to be performed upon expiration of the watchdog timer,
   a sixth command for defining an input to the action to be performed upon the expiration of the watchdog timer,
   a seventh command for restarting the management controller,
   an eighth command for restarting the CPU, or
   a ninth command for logging a message.

* * * * *